United States Patent [19]
Fenley

[11] Patent Number: 5,570,001
[45] Date of Patent: Oct. 29, 1996

[54] HAND PORTABLE BATTERY CHARGER

[75] Inventor: Thomas D. Fenley, Perkasie, Pa.

[73] Assignee: J.L. Behmer Corporation, Perkasie, Pa.

[21] Appl. No.: 311,444

[22] Filed: Sep. 26, 1994

[51] Int. Cl.⁶ .................................................... H02P 9/00
[52] U.S. Cl. ................... 322/36; 322/29; 322/14; 322/16; 320/12
[58] Field of Search .............................. 320/61; 322/27, 322/29, 36

[56] References Cited

U.S. PATENT DOCUMENTS

| | | | |
|---|---|---|---|
| 4,542,462 | 9/1985 | Morishita et al. | 364/424 |
| 4,617,626 | 10/1986 | Morishita et al. | 364/424 |
| 4,651,081 | 3/1987 | Nishimura et al. | 320/64 |
| 4,777,425 | 10/1988 | MacFarlane | 322/28 |
| 4,833,391 | 5/1989 | Thun | 320/23 |
| 4,952,861 | 8/1990 | Horn | 320/23 |
| 5,057,764 | 10/1991 | Fujimoto et al. | 322/14 |
| 5,115,183 | 5/1992 | Kyoukane et al. | 320/61 |
| 5,122,723 | 6/1992 | Sato | 320/64 |
| 5,280,231 | 1/1994 | Kato et al. | 320/31 |
| 5,352,971 | 10/1994 | Nishimura | 322/27 |
| 5,373,196 | 12/1994 | Faley | 307/46 |
| 5,402,007 | 3/1995 | Center et al. | 290/40 B |

Primary Examiner—Thomas M. Dougherty
Assistant Examiner—Nicholas Ponomarenko
Attorney, Agent, or Firm—Joseph W. Molasky & Associates

[57] ABSTRACT

An apparatus for charging a battery using an alternator driven by an engine and a voltage regulator controlling the output of the alternator comprising a control conduit that automatically controls the engine speed from idle on up to that of maximum horsepower at full throttle while simultaneously controlling the charging current to that value which minimizes charging time and maximizes battery life. The apparatus includes a load control circuit that unloads the alternator in response to a sudden increase in the load on the engine or sudden decrease in the engine speed thereby reducing the load on the engine to prevent the engine from stalling. The apparatus also includes a temperature control conduit that decreases the charging current to a predetermined value in response to the battery temperature exceeding a predetermined value indicating that the battery is almost fully charged thereby preventing gassing, and a current rate of change circuit that terminates the charging of the battery in response to the rate of the decreasing current suddenly increasing or decreasing indicating an abnormal charging condition.

15 Claims, 2 Drawing Sheets

HAND PORTABLE BATTERY CHARGER

BACKGROUND OF THE INVENTION

The present invention relates to an apparatus for charging a battery by an alternator driven by an engine.

Often recreational vehicles, boats, and the like have a great number of electrical and electronic equipment. For example, in the case of recreational vehicles, the equipment includes lighting, refrigerators, water pumps, leveling jacks, microwave ovens, radios, television with VCR's, transceivers, air conditioners, and inverters. In the case of recreational boats, the equipment includes the above list and also navigational equipment, radar, depth sounders, fish finders, automatic pilots, water makers, 12 volt electric trolling motors, etc. These loads place a large demand on the generally 6-cell, 12 volt storage batteries which are used to power them. Further, the trend is to add more electrical equipment that will place an ever increasing demand on the storage batteries.

Also, farmers, construction contractors, fleet maintenance groups, and auto repair shops have an occasional need for a quick charge and/or jump start. Thus, there is a need for a compact, hand-portable, engine-driven battery charging apparatus with controlled, safe and quick charge capability to meet these demands.

In addition, these loads when suddenly connected to the battery can cause the engine to stall causing possible damage and inconvenience.

Furthermore, the battery has a phenomenon that the amount of gases may sharply increase at the end of charging.

This phenomenon is called gassing. Thus, it is an object of this invention to meet these needs and to avoid gassing which causes the battery electrolyte to decrease rapidly, thereby shortening the battery life and also can result in the possibility of fire by the gases.

SUMMARY OF THE INVENTION

It is the general object of the invention to provide an apparatus for charging a battery using an alternator driven by an engine with the alternator output being controlled by a voltage regulator and a load control circuit operatively associated with the alternator to unload the alternator in response to a sudden increase in the load on the engine or sudden decrease in the engine speed thereby reducing the load on the engine to prevent the engine from stalling.

It is another object of the invention to provide an apparatus for charging a battery as mentioned above and including a circuit for automatically setting the governed speed of the engine according to the charging current which is that value required for the engine to produce the horsepower required to drive the alternator as determined by the voltage regulator where the engine yields maximum fuel efficiency.

It is another object of the invention to provide an apparatus for charging a battery as mentioned above and including a biasing circuit operatively associated with the load control circuit that does not unload the alternator when the increase in the load or decrease in engine speed is minor or gradual.

It is another object of the invention to provide an apparatus for charging a battery as mentioned above and including a manual throttle control element that inputs a signal to a motor control circuit that causes a motor to set the throttle at a desired position.

It is another object of the invention to provide an apparatus for charging a battery as mentioned above and including a manual governor control circuit operatively associated with the motor control circuit to cause the motor to automatically control the throttle to maintain the engine speed at the desired governed speed as set manually.

It is another object of the invention to provide an apparatus for charging a battery as mentioned above and including a limit circuit that limits the engine speed to that value where maximum horsepower at the full throttle position is obtained.

It is another object of the invention to provide an apparatus for charging a battery as mentioned above and including a temperature control circuit connected between the battery and voltage regulator to reduce the charging current through the voltage regulation when the battery temperature exceeds a certain value thereby preventing gassing.

It is another object of the invention to provide an apparatus for charging a battery as mentioned above and including a current rate of change circuit connected between the battery at the charging current line and the voltage regulator for terminating charging of the battery and shutting down the engine in response to the rate of the charging current suddenly increasing or decreasing indicative of a loose or broken connection to the battery, thermal runaway or other malfunction that causes an abnormal charging condition.

It is another object of the invention to provide an apparatus for charging a battery as mentioned above that automatically controls charging current through voltage regulation to minimize charging time and maximum battery life.

It is another object of the invention to provide an apparatus for charging a battery as mentioned above that automatically switches to an equalizing charge through voltage regulation with temperature correction until the current fails to a certain low value and then automatically shutting down the internal combustion engine.

It is another object of the invention to provide an apparatus for charging a battery as mentioned above that automatically shuts down the engine when the battery charging current falls to a certain low value indicating a fully charged battery.

It is another object of the invention to provide an apparatus for charging a battery that automatically sets the governed speed at low load to minimum value which provides sufficient air cooling on up to a limiting value at high load to that where maximum horsepower is produced at full throttle.

The above and other objects of the invention will be apparent from the following drawings and the detailed description of the invention.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
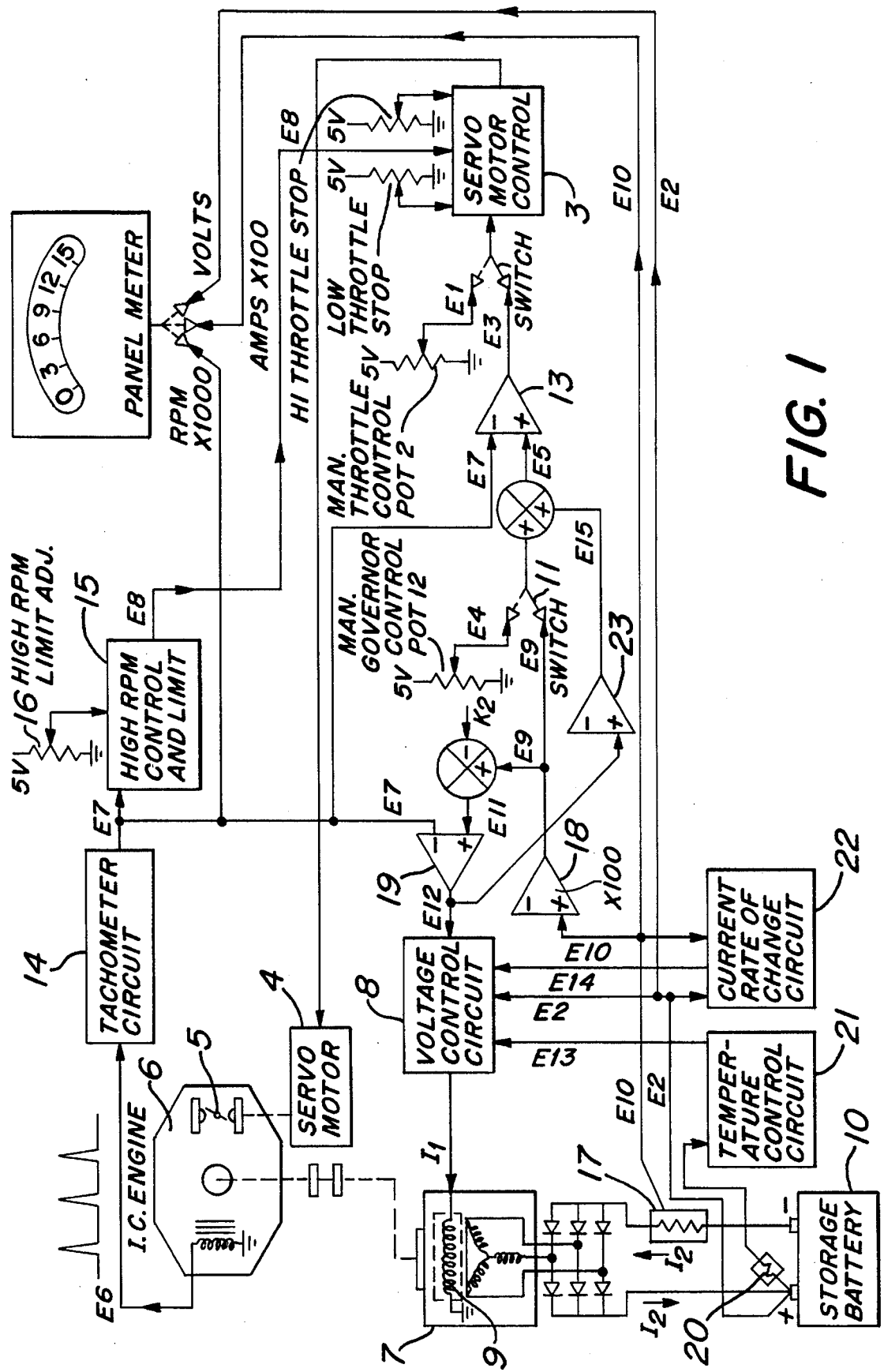
FIG. 1 shows a block diagram of the invention on an internal combustion engine driving an alternator.

Referring to FIG. 1, an internal combustion engine 6 is shown driving an alternator 7 by a coupling 25. The output of the alternator 7 is rectified to direct current $I_2$ by a three phase AC to DC rectifier 28. A storage battery 10 is coupled to the rectifier 28 and is charged by the direct current $I_2$. The output of the alternator is controlled by the level of excitation of a rotating field coil 9 and by the speed of rotation of the field coil 9. A voltage regulator 8 is coupled to the rotating field coil 9.

The control apparatus with regard to manual control of the throttle control is achieved by placing switch 1 in the $E_1$ position to connect potentiometer 2 to a commonly known servo motor control circuit 3 as shown in FIG. 1. Potentiometer 2 can be adjusted from near 0 volts (closed position) to near 5 volts (open position). This variable voltage $E_1$ is the input into the servo motor control circuit 3. The servo motor control circuit 3 causes the servo motor 4 to position the throttle 5 in a non-linear fashion to the voltage $E_1$, so that engine output torque at a constant RPM will be more analogous and proportional to $E_1$.

When the internal combustion engine 6 is running and turning the alternator 7, the voltage regulator 8 will automatically control the current $I_1$ in the internal rotating field coil 9 to maintain voltage $E_2$ from the battery 10 equal to a constant voltage set internally in the voltage regulator 8. This is commonly called a closed loop control. These voltage regulators are commonly used with automobile and other internal combustion engine-driven alternators. They are developed to respond very quickly to a change in load voltage $E_2$. The time constant for this control loop to initiate a change in $I_1$ to correct for a step change in load voltage $E_2$ would be in the order of milliseconds. However, this control apparatus would work only when the throttle opening and internal combustion engine 6 speed is sufficient to handle the change in load.

If the throttle position is not correct, it can be automatically controlled through the servo motor control by manually setting the governed speed. Manual governor control is achieved by returning switch 1 back to the $E_3$ position and placing switch 11 to the $E_4$ position connecting the potentiometer 12. Potentiometer 12 can be adjusted from 0 volts (0 RPM) to 5 volts (15000 RPM). This variable voltage is added at summing point 32 to $E_{15}$ to become $E_5$ which is received by the positive input 37 to operational amplifier 13.

The voltage pulses $E_6$ from the ignition coil low voltage winding are in frequency related directly proportional to the internal combustion engine RPM and are used as input to a commonly known tachometer circuit 14. The tachometer circuit 14 converts $E_6$ input to a proportional 0–5 volts $E_7$ output. $E_7$ is connected to the negative input 35 of operational amplifier 13 and is directly proportional to 0–15,000 RPM of the internal combustion engine 6. The output $E_3$ of the operational amplifier 13 will now act as an input to servo motor control circuit. Operational amplifier 13 with its associated circuitry compares $E_7$ and $E_5$ and will cause its output $E_3$ to increase if $E_7$ is less than $E_5$ which causes the motor to open the throttle 5 to a different position that increases the engine speed. Likewise, operational amplifier 13 will cause its output to decrease if $E_7$ is greater than $E_5$ which causes the motor to close the throttle 5 to a different position that decreases the engine speed. Servo motor control 3, servo motor 4, throttle 5, engine 6, alternator 7, voltage regulator 8, field coil 9, and battery 10 will function as described in the manual throttle control. Servo motor 4 will therefore control the throttle 5 to maintain the RPM of the internal combustion engine 6 constant as set by $E_4$. This is normally referred to as a closed loop control. The time constant to correct for a step change in $E_4$ would be in the order of several seconds.

The tachometer output $E_7$ is also inputed to a high RPM control and limit circuit 15. Its purpose is to sense the approach of RPM to that where peak horsepower occurs at full throttle and, in analog fashion, begins to cancel out further increases in $E_7$ by its output $E_8$ being fed into servo motor control 3 and overriding $E_1$ or $E_3$ input. When the engine speed in RPM is reached where peak horsepower occurs at full throttle, circuit 15 will completely cancel out any further increase in $E_7$ as set by potentiometer 16 and simultaneously reverse the direction of throttle to absolutely limit and hold the internal combustion engine 6 speed to that point where maximum horsepower occurs at full throttle. Control circuit 15 functions simultaneously and independently from all other controls. It acts only at or near the engine speed where peak horsepower occurs. The time constant for a step change in input to control circuit 15 at or near peak horsepower RPM would be measured in milliseconds.

The governed speed in RPM can be automatically set to that value required for the internal combustion engine to produce the horsepower required to drive the alternator as determined by the voltage regulator 8. Automatic governor control is achieved by returning switch 11 from $E_4$ to $E_9$ to connect the control circuitry as follows: A 0.00033 ohm resistor 17, connected between the negative terminal of the battery 10 and rectifier 28, carries load current $I_2$ to produce voltage $E_{10}$ ($E_{10}$=0.00033 $I_2$). $E_{10}$ will therefore vary from 0–50 millivolts as $I_2$ varies from 0–150 amps. The $E_{10}$ voltage line is also connected to a panel meter 31. $E_{10}$ is inputed into operational amplifier 18, which is coupled to the resistor 17, and multiplies $E_{10}$ by 100 so that when charging current $I_2$ varies from 0–150 amps, the governor set point $E_9$ will vary from 0–5 volts which corresponds to $E_7$ a proportional 0–15,000 RPM signal for internal combustion engine 6. This circuit is in a closed loop control where internal combustion engine speed will be controlled automatically by charging current instead of a manual set point as described in the manual governor control. A time constant for this control loop for RPM with a step change in charging $I_2$ would be in the order of several seconds. High RPM and limit circuits also act as described in the manual governor control.

As described in the manual throttle control, a sudden drop in load voltage $E_2$ caused by a sudden increase in load would be corrected in several milliseconds by a corresponding increase in field current $I_1$ through field coil 9. This would result in an increase in internal combustion engine 6 load, also in milliseconds. Without voltage suppression to the regulator to unload the alternator, a sudden increase in load to internal combustion engine 6 may cause it to stall before the automatic governor control can respond. Therefore, an automatic voltage suppression circuit is connected to the system to perform this function. This circuit includes an operational amplifier 19 whose negative input 40 is connected to voltage signal $E_7$ and whose positive input 42 is connected to voltage signal $E_{11}$ from summing point 30, where $E_{11}$=($E_9$–$K_2$). Operational amplifier 19 amplifies the difference between. $E_{11}$ and $E_7$. With $E_7$ being greater than $E_{11}$, $E_{12}$ goes to zero and does nothing to change voltage $E_2$ regulation. However, should $E_7$ be less than $E_{11}$, indicative of a sudden increase in the internal combustion engine 6 load or sudden drop in RPM caused by some engine 6 malfunction or disturbance, hereinafter called upset, which may cause it to stall, $E_{12}$ would rise from zero and suppress voltage $E_2$ regulation by creating a false signal to the voltage regulator 8 that the battery voltage has increased. This unloads the alternator and hence removes the load from the internal combustion engine 6 to prevent stalling. The response time would be in order of milliseconds.

Since $E_{11}$ is biased down by a small constant $K_2$ subtracted from it, no action takes place in operational amplifier 19 until $(E_9-K_2)=E_7$. Action is thereby delayed. Also, since $E_{12}$ is fed into operational amplifier 23, and then amplified to become $E_{15}$, it will, when added to $E_9$, which is falling, maintain $E_5$ to its former level. This will maintain or increase the governed speed during a sudden upset in an effort to allow the internal combustion engine to recover to the correct charge $I_2$ and stable conditions to return. Therefore, if the increase in the load and/or drop in engine speed is minor and gradual, it will not be suppressed but will be compensated for automatically as described under automatic governor control and no momentary voltage suppression by the voltage regulator will take place. However, should a load change or upset occur with sufficient magnitude whereby normal action of an automatic governor control alone cannot prevent stalling, delayed action of the voltage suppression will in milliseconds unload the alternator and simultaneously maintain or increase governed RPM and allow automatic governor control to recover. Further, should the load be of such magnitude that when the engine 6 reaches maximum RPM as set by circuit 15, a degree of voltage suppression will be sustained as a stable condition and maximum RPM will be sustained at full throttle as long as the load or overload continues.

It should be recognized here that, without $K_2$, a situation would exist where $E_9=E_7$ going into operational amplifier 13 and $E_9=E_7$ going into operational amplifier 19 would simultaneously cause operational amplifier 19 to unload the internal combustion engine 6 while operational amplifier 13 opens the throttle and vice versa. This would cause oscillation or hunting between the two circuits. The setting of $K_2$ will cause a slight delay in milliseconds in the application of voltage suppression $E_{12}$ for a sudden upset and allow for an increase if necessary in RPM of internal combustion engine 6 to that magnitude that is required to recover automatic control under sudden upsets.

Figure 2:
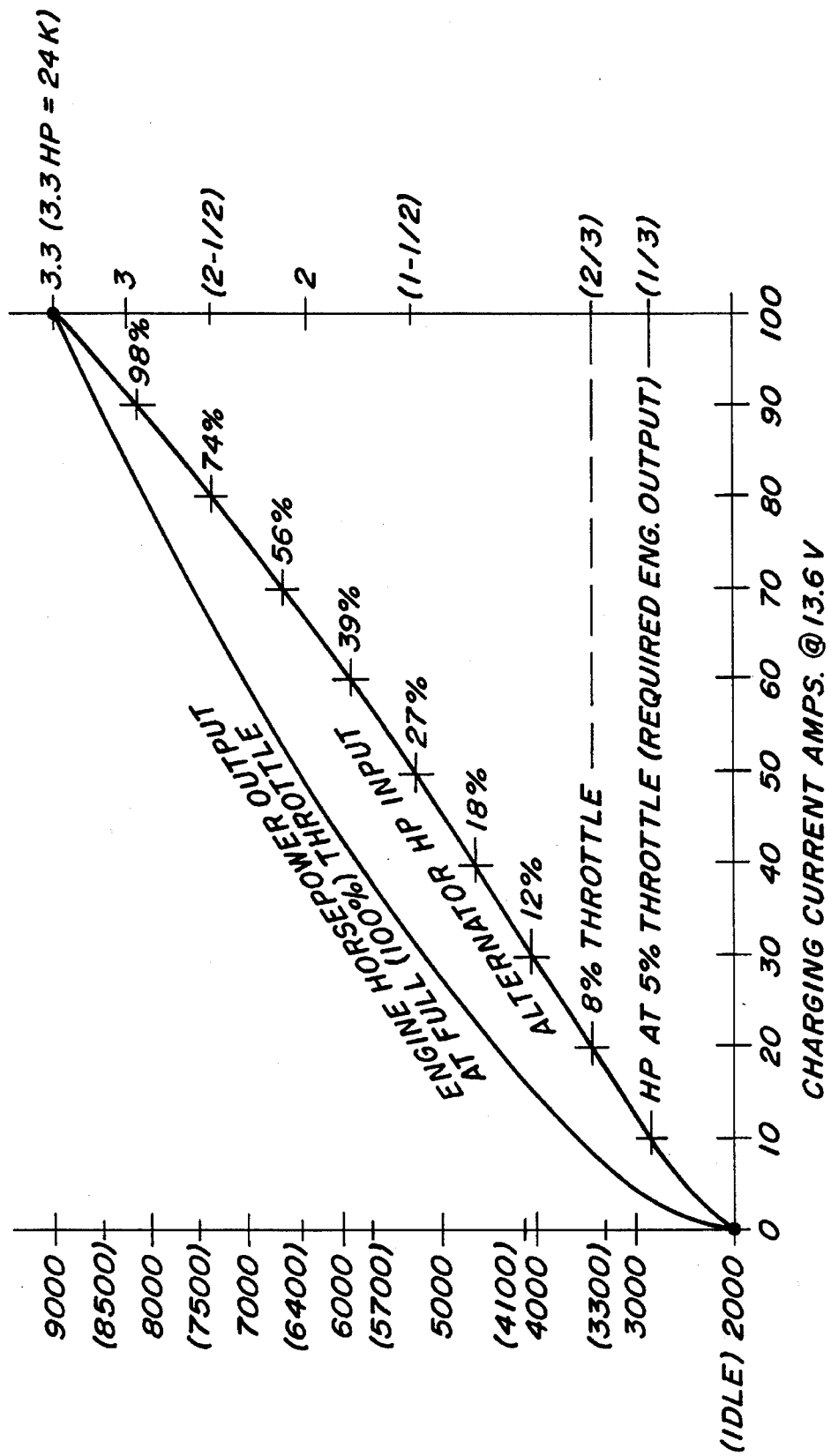
FIG. 2 is a graph illustrating how the alternator output current is being used to control the engine speed using this invention.

FIG. 2 shows a graph of how the alternator current is being used to control the engine speed for a better illustration of the effect and correction of an upset. As long as there is no upset, the engine speed and alternator output form a linear straight line on the graph where $E_5=E_7$ and $E_{11}$ is less than $E_7$ remaining below the curve showing the engine horsepower at full throttle. Any combination of engine speed and alternator output above this curve would cause the engine to stall as shown by arrow f. For example, when the engine speed remains constant, and a sudden upset in alternator current from 60 amperes, point a, to approximately 81 amperes, point b as shown by arrow c occurs, the engine will stall. Likewise, when the alternator current remains constant, a drop in speed from 5750 RPM, point a, to approximately 4350 RPM, point d as shown by arrow e occurs, the engine would stall. The control circuit unloads the alternator in anticipation of an upset when the engine speed and alternator output reach the line where $E_5=E_7$ and $E_{11}$ is greater that or equal to $E_7$.

The battery charging system further can regulate the voltage as a function of temperature and state of charge with means for automatically shutting it down. While it is desirable to shorten the length of time required to charge the lead acid storage battery 10 by charging with the maximum current possible, the charging current must at all times be below that which causes excessive and destructive gassing. This is known as the Ampere-Hour Rule and is expressed by the equation $$I=(AH)e^{-t} \quad (1)$$

where I is the maximum charging current, AH is the ampere-hours removed from a fully charged battery prior to the start of charging, t is the length of time the battery has been charging, and e=2.7183. This current is obtained at a battery temperature of 80 degrees fahrenheit (°F.) by controlling charging voltage to a constant 13.8 volts. When the temperature is above 80° F., the voltage is reduced by approximately 0.021 volts per °F., and when the temperature is below 80° F., the voltage is increased by approximately 0.021 volts per degree F. The AH removed does not have to be known or equal to the AH capacity of the battery in order for charging to begin. It is only necessary that there be less than 100% of AH capacity removed and that the charging voltage be 13.8 volts and corrected for temperature.

Charging current will automatically be throughout the charging cycle approximated by Equation (1). However, it is necessary to know AH capacity in order to know when to consider a battery fully charged. A battery is considered fully charged when charging current falls to approximately 2% of AH capacity with a charging voltage of approximately 13.8 volts corrected for temperature. Further, a battery used in deep discharge cycle service should periodically have an equalizing charge at approximately 14.4. volts, corrected for temperature, following the normal charge at 13.8 volts. The voltage regulator 8 is modified to perform this function. This charge also should be terminated when charging falls to 2% of AH capacity. While AH capacity, especially with old batteries, is generally an unknown quantity, it can be obtained automatically as follows:

$E_2$ from FIG. 1 prior to start of charge is measured with the battery at rest and saved in memory as $E_0$. Since rest voltage for a fully charged battery is 12.6 volts and since rest voltage drops approximately 1.3 volts for a battery considered discharged, $$(12.6-E_2)/1.3 \times 100 = \% \text{ of discharge} \quad (2)$$

$$\text{thus (AH) removed}=(AH) \text{ capacity} \times (12.6-E_0)/1.3 \quad (3)$$

and from Eq(1), $I=(AH)e^{-t}$ we have by substitution at t=0

$I_0=(AH)\text{capacity}\times(12.6-E_0)/1.3$, where t=o and $e^{-t}=1$ \quad (4)

or $(AH)\text{capacity}=1.3\ I_0/(12.6-E_0)$ \quad (5)

where $I_0$=initial charging current at start of charge when charging voltage is 13.8 volts corrected for temperature and $E_0$ is $E_2$ before t=0. (AH) capacity is now automatically computed and saved in memory to be used later for automatic shut off or for initiation of an equalizing charge at 14.4 volts with temperature correction and also followed by automatic shut off at 2% of AH capacity.

While making temperature correction to the charging voltage, it would be most desirable to measure the electrolyte temperature directly. It is, in practice however, not practical to do so primarily but not solely because the electrolyte may fall below the level of the cell plates or separators with a loss of temperature sensing. Automatic temperature compensation is therefore obtained by clamping a thermistor 20 to the positive terminal of the battery 10 as shown in FIG. 1. The positive terminal is used because it is connected to the positive plates where the heat is generated from excess charging current. The thermistor 20 is electrically connected to the temperature control circuit 21 which computes the inverse corrective voltage $E_{13}$ which is fed to the voltage regulator 8 and added to the voltage regulator set point voltage of 13.8 volts when charging or the 14.4 voltage when normal charging is followed by an equalizing charge.

This process, however, introduces an undesirable delay in sensing a rapid increase in cell temperature. This delay along with an error in the initial measurement of $E_2$ as the rest voltage before charging and hence an error in the calculation of 2% of AH capacity could create a condition known as thermal runaway while charging. Also, the first derivative of Equation (1), $(d/dt(I)=-(AH)e^{-t}=-I)$, says that the rate of change is always negative (i.e., decreasing current) and the magnitude is always getting smaller with increasing time t but will never go to zero. However, if the magnitude of a rate of decreasing charging current suddenly becomes greater, it would be indicative of a loose or broken connection to the battery and that charging should immediately and automatically be stopped. In addition, if the magnitude of a rate of decreasing charging current suddenly becomes smaller or becomes zero or shows a positive value, it would be indicative of thermal runaway and again the charging should be immediately and automatically stopped.

Therefore, a current rate of change circuit is coupled between the battery 10 at the charging current line and voltage regulator to prevent this condition. This circuit sums Equation (1) and its derivative and uses the result as the basis. Circuit 22 also senses battery terminal voltage $E_2$ which it saves in memory before charging begins. The initial charging current $E_{10}$ when charging begins is also saved in memory in circuit 22 and used to compute AH capacity according to Equation (5) by using an internal time clock and amplifier or equivalent thereof. Circuit 22 also monitors and sums the first derivative of charging current with the charging current and makes minor changes in voltage regulation with output $E_{14}$ to voltage regulator 8 to force the charging current to conform to the ampere hour rule $(I=(AH)e^{-t}$. Should these corrections be other than minor, an abnormal condition must exist and circuit 22 would cause the charger to shut down. Further, the change of rate circuit performs the function of shutting down the engine when the battery charging current falls to a certain low value indicating a fully charge battery.

Additional changes and modifications to the embodiment of the invention as described herein can also be made, as will be apparent to those skilled in the art, while still remaining within the spirit and scope of the disclosed invention as set forth in the appended claims.

What is claimed is:

1. An apparatus for charging a battery, an alternator connected to said battery, an engine to drive said alternator for producing a charging current to charge said battery, said engine having a throttle, a motor connected to a motor control circuit provided to position said throttle, said apparatus having a voltage regulator for controlling the output of said alternator, said apparatus comprising:

automatic governor control means operatively associated with said motor control circuit for producing a set point signal that varies in relation to the charging current and is inputed into said motor control circuit that causes said motor to automatically control said throttle to set the governed speed according to said charging current; and load control means for controlling the output of said alternator to prevent said engine from stalling, said load control means being operatively associated with said voltage regulator and responsive to both a speed signal representative of the rotational speed of said engine, and a load signal proportional to said charging current, said load control means causing said voltage regulator to reduce the output of said alternator when the difference between said speed signal and said load signal is indicative of a sudden increase in load or a sudden decrease in the rotational speed of the engine or a combination thereof.

2. The apparatus of claim 1 including a manual throttle control means connected to said motor control circuit for producing an input signal to said motor control circuit that causes the motor to position the throttle proportional to said input signal.

3. The apparatus of claim 1 including a manual governor control means operatively associated with said motor control circuit for producing an input signal to said motor control circuit that causes said motor to automatically control said engine as set by said input signal.

4. The apparatus of claim 3 including an amplifier connected between said manual governor control means and said motor control circuit, said amplifier having a first input receiving a signal representative of the speed of the engine and a second input receiving said input signal, said amplifier comparing said inputs and producing an output signal received by said motor control circuit to cause said motor to position the throttle to increase the speed of the engine when said speed signal is less than the input signal, said amplifier comparing said inputs and producing an output signal received by said motor control circuit to cause said motor to position the throttle to decrease the speed of the engine when the speed signal is greater than the input signal.

5. The apparatus of claim 1 including an amplifier connected between said automatic governor control means and said motor control circuit, said amplifier having a first input receiving a signal representative of the speed of the engine and a second input receiving said set point signal, said amplifier comparing said input signal and producing an output signal received by said motor control circuit to cause said motor to position the throttle to increase the speed of the engine when said speed signal is less than the set point signal, said amplifier comparing said input signals and producing an output signal received by said motor control circuit to cause said motor to position the throttle to decrease the speed of the engine when the speed signal is greater than the set point signal.

6. The apparatus of claim 1 including a biasing means operatively associated with said load control means to prevent the unloading of said alternator when the increase in the load or decrease in the speed of the engine is minor and gradual.

7. The apparatus of claim 1 including a converter means operatively connected to said engine for producing said speed signal.

8. The apparatus of claim 7 including a limit means coupled to said converter means for limiting engine speed to that value where maximum horsepower at full throttle is obtained.

9. The apparatus of claim 1 including a temperature control circuit connected to said voltage regulator and said battery, said temperature control circuit decreasing the charging current to a predetermined value in response to said battery temperature exceeding a predetermined value thereby preventing excessive gassing of said battery.

10. The apparatus of claim 9 including a sensing means connected between said battery and said temperature control circuit for sensing the temperature of said battery.

11. The apparatus of claim 10 including a current rate of change circuit connected to said charging signal and said voltage regulator, said current rate of change circuit terminating the charging of said battery and shutting down said engine in response to the rate of change of the decreasing charging current suddenly increasing or decreasing from the value of charge current.

12. The apparatus of claim 11 wherein said current rate of change circuit includes means for compensating the charging current to conform to a desired value.

13. The apparatus of claim 1 including means operatively associated with said load control means and motor control circuit for increasing or maintaining the engine speed upon said load control means unloading said alternator.

14. The apparatus of claim 1 wherein said load control means includes an amplifier having a first input for receiving said speed signal and a second input for receiving said load signal, said regulator being connected to the output of said amplifier, said amplifier comparing said input signals and generating an output signal when the difference between said load signal and said speed signal exceeds a value indicative of a sudden increase or a sudden decrease in engine speed or a combination thereof, said output signal causing said voltage regulator to suppress the field voltage of said alternator.

15. The apparatus of claim 12 wherein said output signal from said amplifier is added to said load signal to compensate for the suppression of said charging current resulting from the reduced output of said alternator, thus, preventing said engine from decreasing in speed as a result of the suppressed charging current.

* * * * *